United States Patent [19]
Blencowe

[11] 3,802,926
[45] Apr. 9, 1974

[54] THERMOCOUPLE WITH SPACED ELECTRICALLY INSULATING SHEATHS

[75] Inventor: Clifford A. Blencowe, Painted Post, N.Y.

[73] Assignee: Corning Glass Works, Corning, N.Y.

[22] Filed: Apr. 24, 1972

[21] Appl. No.: 246,920

[52] U.S. Cl................. 136/232, 136/230, 136/242
[51] Int. Cl.............................................. H01v 1/02
[58] Field of Search .......... 136/230, 231, 234, 232, 136/226, 242, 233; 13/6; 263/11; 73/359

[56] References Cited
UNITED STATES PATENTS

| | | | |
|---|---|---|---|
| 3,106,493 | 10/1963 | Japka | 136/242 |
| 3,379,578 | 4/1968 | McTaggart et al. | 136/242 |
| 3,416,972 | 12/1968 | Haselton et al. | 136/230 |
| 3,499,310 | 3/1970 | Hundere et al. | 73/359 X |
| 2,843,646 | 7/1958 | Conant | 136/242 |
| 3,097,973 | 7/1963 | Wieszeck | 136/234 |

FOREIGN PATENTS OR APPLICATIONS 507,835  1/1955  Italy..................................... 73/359

OTHER PUBLICATIONS
"Thermo–Electric Ceramo Metal Sheath...," Thermo–Electric Co., Inc., Copyright 1965, pp. 360-1-360-13.

"Rare Metal Thermocouples For Higher Temperatures," Brown Instrument Co., Cat. 1102, 1937, p. 43.

Primary Examiner—Carl D. Quarforth
Assistant Examiner—E. A. Miller
Attorney, Agent, or Firm—Charles W. Gregg

[57] ABSTRACT

A thermocouple especially adaptable for use in electrically heated or electric glass melting tanks or furnaces. Means are provided for electrically grounding the thermocouple to prevent stray or inductive electrical energy from the electric heating elements or electrodes used for melting of a glass in an electrical glass melting furnace from interfering with the proper operation of temperature indicating, recording or control components associated or connected with the hot junction of the thermocouple. The novel thermocouple also provides for ease and rapidity of change-out of a deteriorated hot junction or associated parts of a thermocouple which extend through a sidewall of a glass melting tank or furnace below the upper level of the molten glass and for a short distance into the molten glass.

4 Claims, 2 Drawing Figures

THERMOCOUPLE WITH SPACED ELECTRICALLY INSULATING SHEATHS

BACKGROUND OF THE INVENTION

Thermocouples are usually used as sensing devices in glass melting tanks or furnaces for sensing temperatures in areas above the molten glass level of a tank or furnace or for sensing temperatures of the molten glass itself by being immersed in the glass body in a tank or furnace. For example, there is shown in FIG. 2 of U.S. Pat. No. 3,596,889, issued Aug. 3, 1971 to George F. Hanks, a temperature sensing element 38 which is located in the roof 33 of a glass melting furnace and above the surface of the glass 28 in such furnace. The sensing element 38 may be a thermocouple, as is well known. There is also shown in FIGS. 1 and 4 of U.S. Pat. No. 3,636,227, issued Jan. 18, 1972 to Gerald J. McQuaid, a thermocouple 58 which extends through the side of an electric glass melting tank or furnace 10 at a position below the upper level of molten glass 20 (FIG. 2) in such tank and for a short distance beyond the inner sidewall 14 of container 12 of the tank. Thus, the end of thermocouple 58 extends into the molten glass 20.

In electric melting furnaces, such as that shown in the above-cited patent to G. J. McQuaid, for example, electric currents often stray into or are induced in a thermocouple such as 58 and such currents may intolerably disturb the sensing function of the thermocouple and the proper operation of the indication, recorder or process control units connected or associated therewith. It has heretofore been proposed to connect an electrical ground to the outer platinum or other corrosion resistant metal sheath of thermocouples such as usually used below the glass surface in electric melting furnaces, but it was found that intolerable so-called "bubbling" of molten glass of certain compositions resulted adjacent the thermocouple when such a ground was employed. In electric melting furnaces employing electrical resistance heating elements such as so-called glow-tubes, and in which a thermocouple or thermocouples are located above the surface of the molten glass or do not intrude into a bath of molten glass, such a thermocouple is not provided with a platinum or similar outer sheath because the atmosphere in such region is extremely corrosive even to platinum or similar metals. Therefore, with such a thermocouple, there was no sheath which could heretofore be grounded for prevention of the disturbances in the temperature sensing thermocouple and its associated components caused by induced electrical current from said so-called glow-tubes or electrical resistance heating elements. The thermocouple of the present invention was developed to overcome the problems discussed above.

SUMMARY OF THE INVENTION

The invention is believed sufficiently summarized in the foregoing abstract of the disclosure and, therefore, to prevent repetition or redundancy, no further summary of the invention is considered necessary or will be given.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
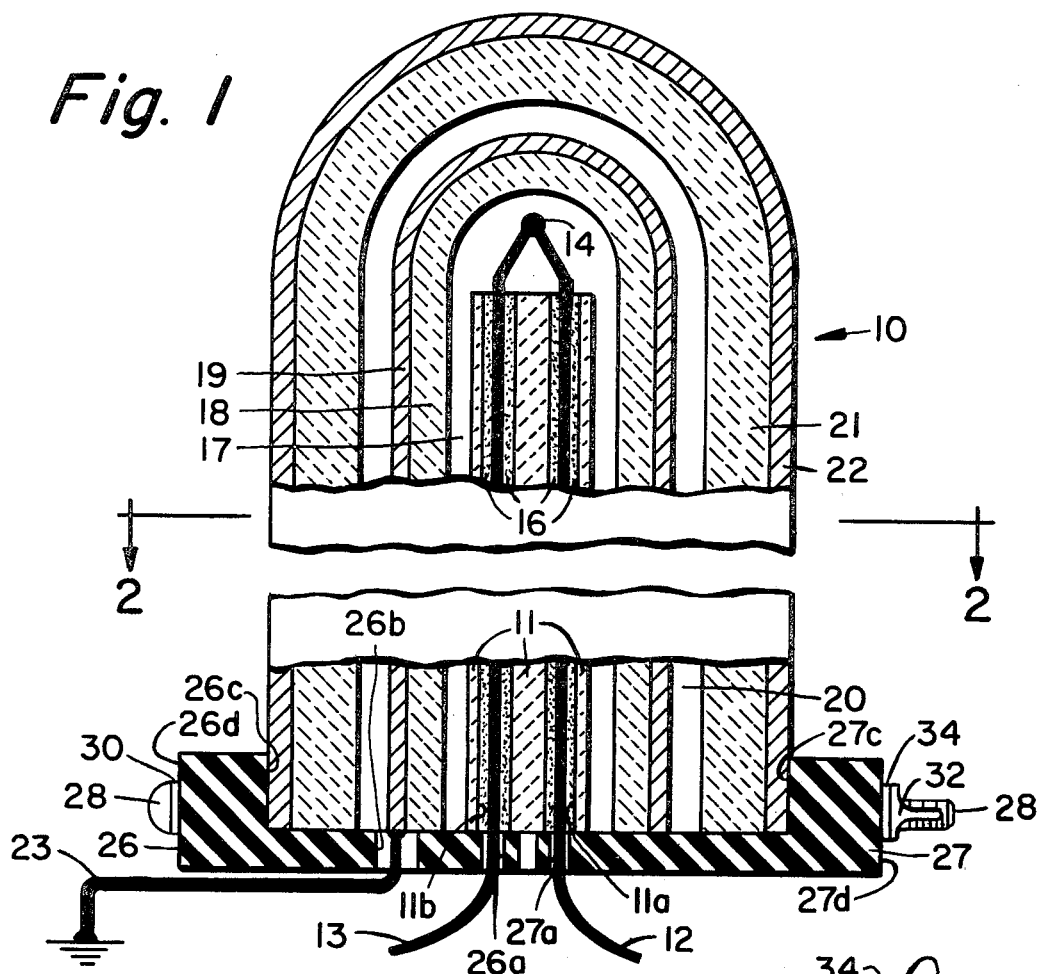
FIG. 1 is an elevational view, substantially in cross-section, of a thermocouple embodying the invention.

Referring to the drawings in detail, there is shown, on a substantially enlarged scale, a thermocouple 10 comprising a longitudinal center or core member 11 of a high temperature resistant material such as high purity alumina. Center or core member 11 may, for example, have a diameter of 3/16 of an inch and such member embodies a pair of similar passages 11a and 11b extending longitudinally therethrough and each of which may, for example, have a diameter of 3/64 of an inch. A first electrical lead or wire 12 having a diameter of about 0.020 of an inch and comprising 100 percent platinum, for example, extends through said passage 11a and out of both ends of such passage. A second electrical wire or lead 13 also having, for example, a diameter of about 0.020 of an inch extends through said passage 11b and out of the ends thereof. Such second lead or wire may, for example, comprise 90 percent platinum and 10 percent rhodium. First ends of wires or leads 12 and 13 are joined to each other to form or provide a hot junction 14 as is well known in the art. The second ends of the wires or leads are intended for connections to temperature indicating, recording or control system components as is also well known in the art. It is preferred, but not necessary, to provide a hardened slurry 16 in passages 11a and 11b and surrounding leads 12 and 13. Such slurry may, for example, comprise powdered alumina which is mixed with a suitable vehicle and introduced into passages 11a and 11b by a vacuum assist and is then permitted to harden or is set by a suitable baking cycle in the manner well known in the art.

A closed end tube or jacket 18 of high purity alumina surrounds core member 11 with hot junction 14 disposed adjacent the inner surface of the closed end of tube 18. Tube 18 may, for example, have an inner diameter of about 9/32 of an inch and an outer diameter of about 12/32 of an inch. An inner diameter of such size provides for an air space 17 of about 3/64 of an inch between the outer peripheral surface of core member 11 and the inner surface of tube or jacket 18. Such air space permits core member 11 to be readily inserted into and removed from the hollow or interior of tube 18. The outer surface of tube 18 is contiguously and entirely surrounded by a closed end coating, sheath or tube 19 which has a wall having, for example, a thickness of about 6 to 20 mils, that is, a thickness of about 0.006 to 0.020 of an inch, and which comprises a high melting and corrosion resistant metal such as platinum or rhodium, for example. As thus far described, the thermocouple is similar to previous types of thermocouples which have long been used for temperature sensing purposes in glass melting furnaces. The improved thermocouple for such uses further includes the additional parts discussed below.

A second closed end tube or jacket 21 of high purity alumina and having an inner diameter of about one-half of an inch and an outer diameter of about three-fourths of an inch, surrounds tube or jacket 18 and its sheath 19 with the inner surface of the closed end of tube 21 being disposed adjacent to but spaced from the outer surface of the closed end of sheath 19. A tube or jacket having an inner diameter of the size stated provides for an air space 20 of about 1/16 of an inch between the outer surface of sheath 19 and the inner surface of tube 21. Such air space permits tube 18, together with its sheath 19, to be readily inserted into and removed from the hollow or interior of tube or jacket 21. Tube or jacket 21 is also contiguously and entirely surrounded by a closed end coating, sheath, or tube 22 which has a wall also having a thickness of about 6 to 10 mils, for example, and which may comprise the same metal material as that of sheath 19, for example. One end of an electrical conductor or lead 23 (FIG. 1) is connected to sheath 19, as by welding or soldering thereto. The second end of such conductor or lead is intended to be connected directly to an electrical ground as shown conventionally in FIG. 1, or connected through a resistor, a capacitor or an RC network to such a ground. The purpose of such grounded lead or conductor will be discussed briefly hereinafter.

A suitable support and handling member for thermocouple 10 is also shown in the drawings and comprises a pair of similar complementary or cooperative blocks 26 and 27 of an electrically insulating, high temperature resistant and substantially rigid material, such as hard asbestos material for example. Such blocks embody circular recessed regions 26c and 27c, respectively, in each of which there snugly fits a substantially semicircular portion of the outer periphery of thermocouple 10 as best illustrated in FIG. 1. Blocks 26 and 27 also embody passages 26a and 27a through which there extends the previously mentioned electrical leads 13 and 12, respectively. Block 26 is also shown as embodying a passage 26b through which ground lead or conductor 23 extends. A pair of relatively long bolts 28 and 29 extend through suitable passages embodied in blocks 26 and 27 with the heads of the headed ends of such bolts bearing against cooperative washers 28 and 30, respectively, which in turn bear against one edge 26d of block 26, for example. The second ends of the bolts are threaded and thumb screws 32 and 33 are screwed onto such second ends of bolts 28 and 29, respectively, with washers 34 and 35, respectively, being provided between the thumbscrews and edge 27d of block 27. Thumbscrews 32 and 33 are tightened to securely clamp blocks 26 and 27 about the outer periphery of thermocouple 10 as is readily apparent. It is pointed out that the specific support and handling member shown and comprising blocks 26 and 27 and their associated components is not critical, and such support and handling member may take various forms as will be readily apparent to those skilled in the art.

Figure 2:
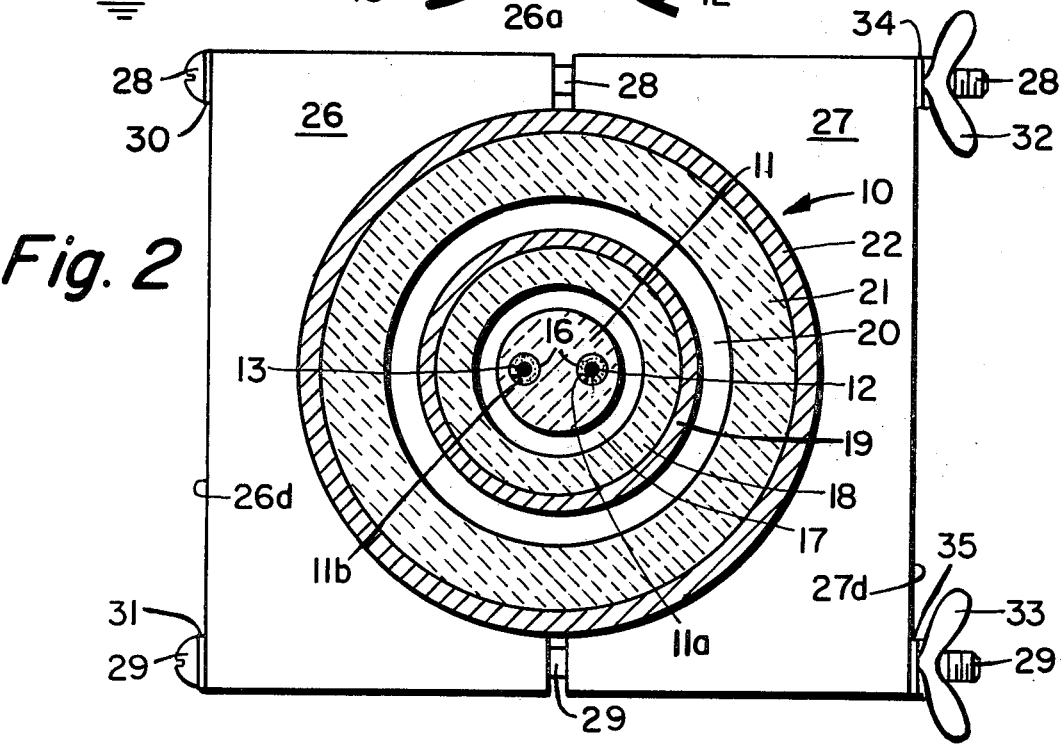
FIG. 2 is a cross-sectional view of the thermocouple of FIG. 1 such view being taken generally along line 2—2 of FIG. 1.

When the novel thermocouple disclosed is used in an electric glass melting tank or furnace in which the thermocouple is located above the molten glass body as, for example, in the previously cited patent to George F. Hanks, the outer coating, sheath, or tube 22 shown in FIGS. 1 and 2 is not employed because, as previously pointed out, the atmosphere above the surface of molten glass batches of certain compositions is very corrosive to metals of the type which can be used for the material of sheath 22. However, such an atmosphere is not intolerably harmful to alumina and, therefore, the thermocouple shown in FIGS. 1 and 2 and without the outer sheath 22 is used as stated. When the thermocouple is so used, electrical conductor or lead 23 is connected with an electrical ground either directly as shown schematically in FIG. 1 or through suitable electrical components as previously mentioned. Although alumina normally has relatively high electrical insulating properties, when it is used in a very high temperature environment, as in a glass melting tank or furnace, it becomes a relatively good electrical conductor. Therefore, in an electrical glass melting tank or furnace where, as previously mentioned, electric currents often stray or are induced, such currents can be conducted through the hot alumina of a usual type of thermocouple to the electrical leads and/or hot junction of the thermocouple. However, in the thermocouple disclosed herein, any stray or induced electric currents conducted through the hot alumina of the tube, such as 21, to the coating, sheath, or tube 19 is further conducted over electrical lead or conductor 23 to ground and, therefore, does not flow to leads or conductors 12 and 13 nor to hot junction 14 and does not interfere with the proper operation of the indicating, recording or control components associated with the thermocouple. Such electrical grounding of the thermocouple also eliminates an electric shock hazard to personnel working with or near the thermocouples or the components associated therewith. Furthermore, the air spaces such as 17 and 20 provide a substantial degree of electrical insulation for the thermocouple 10 as well as permitting ready removal and replacement of the hot junction 14, and its electric conductors and leads 12 and 13.

When the thermocouple disclosed is employed so that it extends into a body of molten glass, that is, extends through the wall of a glass melting tank or furnace and a short distance into a body of molten glass therein, the outer sheath or tube 22 is provided because molten glass is very corrosive. An outer sheath of a metal such as platinum or rhodium etc. is, therefore, used because of the corrosion resistant properties and high melting point temperatures of such metals. When a thermocouple such as that shown in FIGS. 1 and 2 of the drawings and including the outer tube or sheath 22 is employed as described, the alumina tube 21 and its outer sheath 22 need not be removed from the wall of the glass melting tank or furnace for replacement of the hot junction and its electrical leads, but core member 11 and the hot junction such as 14 etc. can be removed alone, or in conjunction with tube 18 and its sheath 19, leaving tube 21 and sheath 22 in the furnace or tank wall to maintain the glass seal between the sheath and the surrounding surface of the passage through which tube 21 and sheath 22 extend and, thereby, prevent flow of molten glass out of the tank through such passage. Heretofore, in the replacement of thermocouples used in such an environment, much time had to be spent in melting the glass seal surrounding a thermocouple in order for the thermocouple to be removed. Furthermore, a replacement thermocouple had to be very rapidly inserted in the place of the removed thermocouple to keep the flow of molten glass through the thermocouple passage to a very minimum. As is obvious, the removal and replacement of thermocouples has, therefore, previously been a relatively difficult and very hazardous task. It is pointed out that sheath 19 is also electrically grounded when the thermocouple disclosed extends into a body of molten glass. This is for the same reasons set forth in conjunction with the disclosed thermocouple when used above the surface of a body of molten glass.

It is also pointed out that the dimensions set forth for the various parts of the thermocouple 10 are in no way critical but are set forth by way of examples only. Such dimensions can vary substantially within reasonable and/or tolerable limits which provide for strength in conjunction with ease of handling of a thermocouple such as 10.

It is further pointed out that, although the thermocouple of the type herein disclosed is described as especially adaptable for use in electric glass melting tanks or furnaces, such thermocouple could as well be used in melting tanks or furnaces using gas or other types of fuel for melting purposes.

Although there is herein described only two forms of a thermocouple embodying the invention, it will be understood that various changes and modifications may be made therein within the purview of the appended claims without departing from the spirit and scope thereof.

I claim:

1. In a thermocouple including a longitudinal core member of electrically non-conductive and high temperature resistant material embodying a pair of dissimilar high temperature resistant electrical conductors extending longitudinally therethrough and joined at one end thereof to form a thermocouple hot junction, the combination comprising;

I. a first closed end tube of electrically non-conductive and high temperature resistant material surrounding said core member and said hot junction with an aeriform fluid space provided between the outer surface of the core member and the inner surface of the tube;

II. a sheath of a high melting and corrosion resistant metal contiguously and entirely surrounding the outer surface of said tube;

III. a second closed end tube of electrically non-conductive and high temperature resistant material surrounding said sheath with an aeriform fluid space provided between the outer surface of the sheath and the inner surface of such second tube; and IV. a high temperature resistant electrical conductor having one end connected to said sheath and its other end adapted to be connected with an electrical ground.

2. A thermocouple as in claim 1 and in which said core member and said tubes comprise high purity alumina, and said sheath is platinum.

3. A thermocouple as in claim 1 and further including a second sheath of a high melting and corrosion resistant metal contiguously and entirely surrounding the outer surface of said second tube.

4. A thermocouple as in claim 3 and in which said core member and said tube comprise high purity alumina and said sheaths are platinum.

* * * * *